United States Patent [19]

Helms et al.

[11] 3,721,210

[45] March 20, 1973

[54] LOW VOLUME DEPOSITION REACTOR

[75] Inventors: John D. Helms; Olin B. Cecil, both of Dallas, Tex.

[73] Assignee: Texas Instruments Incorporated, Dallas, Tex.

[22] Filed: April 19, 1971

[21] Appl. No.: 135,255

[52] U.S. Cl. ..................118/48, 118/62, 294/64 B
[51] Int. Cl. ..............................................C23c 13/08
[58] Field of Search.....................118/48–49.5, 6, 118/62, 63, 500, 503; 117/61.1; 269/20, 55, 57; 294/64 R, 64 A, 64 B

[56] References Cited

UNITED STATES PATENTS

| | | | |
|---|---|---|---|
| 2,953,483 | 9/1960 | Torok | 118/49 X |
| 3,020,128 | 2/1962 | Adcock et al. | 118/480 X |
| 3,041,133 | 6/1962 | Hicks et al. | 269/20 X |
| 3,161,542 | 12/1964 | Ames et al. | 118/49.1 X |
| 3,223,549 | 12/1965 | Fredley et al. | 118/62 X |
| 3,236,205 | 2/1966 | Kopito | 118/49.1 |
| 3,321,092 | 5/1967 | Brichard | 118/49 |
| 3,466,079 | 9/1969 | Mammel | 294/64 R |
| 3,469,560 | 9/1969 | Bukkila et al. | 118/49 X |
| 3,627,590 | 12/1971 | Mammel | 118/62 UX |

FOREIGN PATENTS OR APPLICATIONS

| | | | |
|---|---|---|---|
| 1,326,679 | 4/1963 | France | 118/48 |
| 693,416 | 7/1953 | Great Britain | 118/48 |

Primary Examiner—Morris Kaplan
Attorney—James O. Dixon, Andrew M. Hassell, Harold Levine, Melvin Sharp, Michael A. Eo, Jr., Gary C. Honeycutt, John E. Vandigriff, James B. Hinson, Stephen S. Sadacca and Richard L. Donaldson

[57] ABSTRACT

A reactor system for sequentially forming layers on substrates, by either reacting a gas with a surface of a substrate or by selective precipitation of constituents of a gas on a surface of a substrate, is disclosed. The uniformity of the layer is increased by rotating the substrate as the gas is passed over the surface of the substrate. Improved substrate temperature control is provided by optical heaters. Each reactor chamber has a low volume, thereby reducing the contamination problems associated with loading and unloading the reactor. Automatic load/unload apparatus is provided, permitting the reactor to be loaded and unloaded without a clean-up cycle.

8 Claims, 12 Drawing Figures

LOW VOLUME DEPOSITION REACTOR

SUMMARY OF THE INVENTION AND BACKGROUND INFORMATION

Prior art reactors have primarily operated on the batch process system. In typical prior art systems, the slices were supported by a graphite or carbide susceptor and positioned in a deposition chamber. The chamber was then purged with an inert gas, such as helium, to remove oxygen and other impurities. The slices were heated to the deposition temperature by coupling RF energy into the susceptors where it was converted to heat by hystersis currents. The temperature of the slices was maintained at a predetermined temperature and the deposition gas allowed to flow over the slices for a time sufficient to form layers of the required thickness. After the layer of the required thickness had been formed, the temperature of the slice was reduced and the deposition gas purged from the chamber by an inert gas such as helium. The reactor was opened and the slices removed and the basic cycle repeated.

These prior art systems had many disadvantages. Included among these disadvantages was the fact that the deposited layer may extend over the edge of the slice and down on the susceptor and cause the slice to stick to the susceptor. As with all batch processes, the production rate was significantly reduced by the time required to load, unload and purge the reactor chamber. In addition to the above disadvantages which tended to affect the production rate and the quality of the slices, many prior art systems were relatively hazardous in that the volumes contained inside the deposition chamber were relatively large and some of the deposition gases tend to be rather explosive.

The epitaxial reactor system which is the subject of this invention makes significant contributions to the art by solving the aforementioned problems, as well as many other problems and disadvantages associated with the prior art systems. These advantages and improvements are provided by low volume single slice reactor chamber in which the slice floats and rotates on a first thin layer of fluid, hydrogen for example, while the deposition gas flows over the top surface. The tendency of the slice to stick to the susceptor is eliminated by the floating and rotating of the slice. The rotation also assists in maintaining all areas of the slice at a uniform temperature. The purge cycle at the beginning and end of each deposition cycle is eliminated by providing a mechanism which permits slices to be loaded into and removed from the deposition reactor without contaminating the chamber by the external environment. A radiant heater is provided for heating the slice. The radiant heater is simpler and much easier to control, thereby reducing the cost and improving the performance of the system as compared with prior art systems. Temperature control is further improved by the fact that each slice is provided with an independent heater and its independent control system. This eliminates the problem of maintaining a constant temperature over a rather large area as was required with the prior art reactors. The hydrogen also protects the lower surface of the slice by maintaining a reducing atmosphere in this region and by preventing the deposition gas from migrating under the slice.

If more than one layer is to be deposited on a slice during a single cycle through the system, a separate reactor chamber is provided for each layer. Each slice is sequentially cycled through each of the reactor chambers with a new layer being formed in each reactor.

The above described reactor system can be used to grow various types of layers on the surface of a substrate by changing the deposition gas to a gas which chemically reacts with the substrate to form the desired layer. Examples of typical layers which can be so formed are $SiO_2$ on a silicon substrate and silicon nitride on a silicon substrate. The reactor may also be used to diffuse impurities into a substrate. In general, the reactor system is adaptable to all the gas phase layer forming processes and diffusion processes.

Slice and substrate are used interchangeably in this specification. Either term includes any solid body on which a layer of similar or dissimilar material may be formed using the disclosed apparatus and methods.

DETAILED DESCRIPTION

Figure 1:
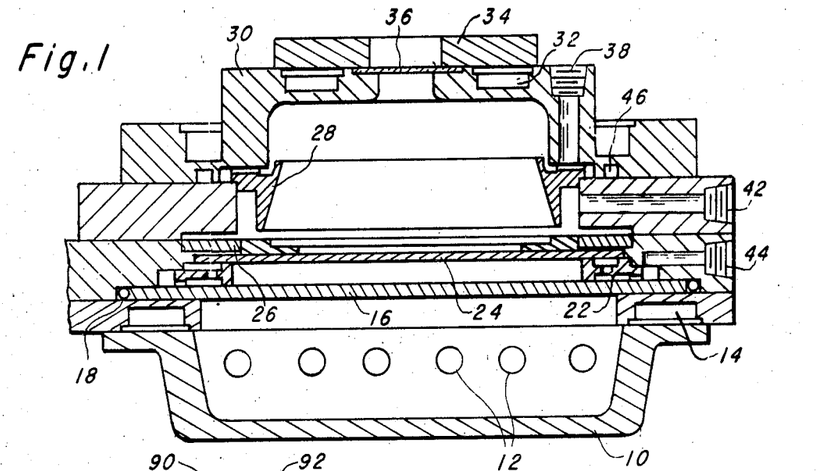
FIG. 1 is a cross-section view of a reactor chamber.

The deposition reactor which is used in the system, which is the subject of this invention, is shown in cross-section in FIG. 1. Functionally, this reactor provides means for rotating the semiconductor slice while it is being heated by optical heaters and a reactant gas is being passed over the upper surface. The slice is rotated by passing a gas, such as hydrogen, through openings in a spin ring 22. The upper portion of the reactor has a transparent window 36 through which the surface temperature of the semiconductor slice may be monitored by a radiation-type temperature sensing device for purposes of temperature monitoring and control.

For convenience of discussion, the circular reactor shown in cross-section in FIG. 1 can be roughly divided into three portions. The first portion provides a means for heating the slice and consists of the optical heaters 12 and a reflector 10 which is positioned over the bottom portion of the reactor chamber. The second portion of the chamber provides means to support and rotate a semiconductor slice and consists of a spin ring 22, slice support disk 24 and a slice positioning ring 25. The third or upper portion is the chamber through which the deposition or reactant gas flows. The upper portion of the chamber is designed to assure that the deposition gas is uniformly distributed over the surface of the slice. Included is a window 36 through which the temperature of the slice may be measured by a radiation-type temperature sensor.

The deposition or reactant gas enters through inlet port 38 and is distributed around the distribution cone by distribution annulus 40 and flows over the upper edge of the distribution cone 28, over the top of the slice, under the lower edge of the distribution cone, and out the exhaust gas port 42. The spin gas enters through inlet port 44 and is distributed around the spin ring by the distribution annulus 20 and then flows under the lower edge of the spin ring and up through openings in the spin ring 22 around the edge of the slice support disk 24, around the edges of the slices and the slice positioning ring, mixes with the deposition gas near the lower edge of the distribution cone 28, and flows out of the exhaust port 42.

The heaters 12 are a series of incandescent lamps positioned above a reflecting surface 10. The incandescent lamps and the reflecting surface are designed such that substantially all of the heat radiated by the lamps will be reflected up through sealing disk 16 and slice support disk 24, and impinge on the under surface of the slice. The materials for the sealing disk and the slice support disk are chosen such that the sealing and support disk have a low absorption coefficient in a region corresponding to the emission spectrum of the lamps. Typically, both of these disks are made of quartz. The slice positioning ring 25 positions the slice in the central portion of the chamber, and isolates the turntable 26 from the high temperatures present in the central portion of the deposition chamber. The slice positioning ring is preferably made of a chemically inert material capable of withstanding high temperature. Typical suitable materials include graphite, quartz or silicon carbide. The sealing ring gasket 18 is an O-ring and has a diameter slightly larger than the thickness of the sealing disk 16, and the outer diameter of the sealing disk is adjusted such that the joint made by the sealing disk and the cavity body can be substantially sealed without the body members exerting substantial forces on the sealing disk. This is necessary since the sealing disk is typically made of quartz and will crack when heated if it is subjected to significant pressures. A cooling water cavity 14 is provided through which cooling water can be circulated to prevent the sealing disk gasket 18 from being subjected to damaging temperatures.

The upper portion of the cavity body is made in two parts consisting of an upper housing 30 and a window sealing ring 34. The window sealing ring 34 holds a quartz window 36 in position and seals the upper portion of the cavity. Cooling of the upper portion of the cavity may be necessary to prevent the quartz window 36 from being broken by the differential expansion between the metal housing and the quartz window 36, and to prevent thermal deposition on the surface. Cooling for this purpose is provided by two water passages 32 through which cooling water can be circulated. Other types of cooling may also be used. Turntable 26 provides a means by which the slices can be automatically transferred into and removed from the deposition chamber. This function will be fully described in the systems description which appears later in this application.

Two basic mechanisms are provided for supporting and rotating the semiconductor slice. These two mechanisms are partially illustrated in cross-section in FIGS. 2 and 3.

Figure 2:
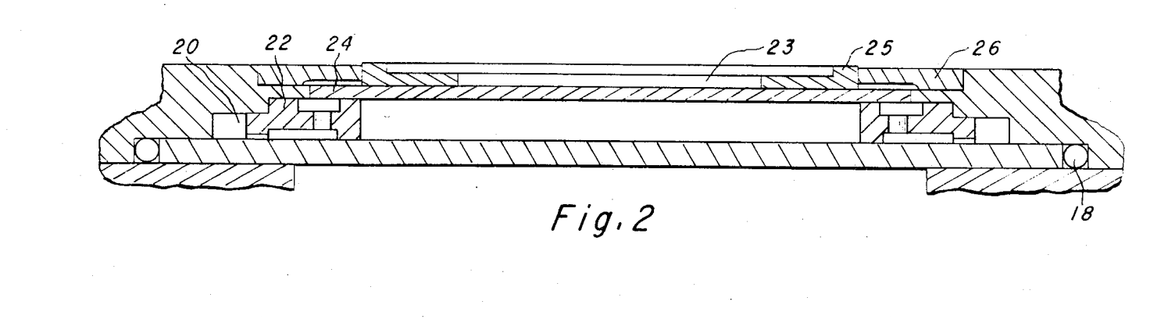
FIG. 2 is a cross-section view of a first embodiment of the slice support mechanism.

In the apparatus illustrated in FIG. 2, the slice support disk 24 rests on the spin ring 22. The flow of the spin gas through distribution annulus 20 through the openings in spin ring 22 causes the spin ring and the slice support ring to rotate. The rotary force is generated by the flow of the spin gas. Since slice support disk 24 rests on the spin ring and slice 23, in turn, on slice support disk 24, the rotation of spin ring 22 rotates slice support disk 24 and slice 23.

Figure 1A:
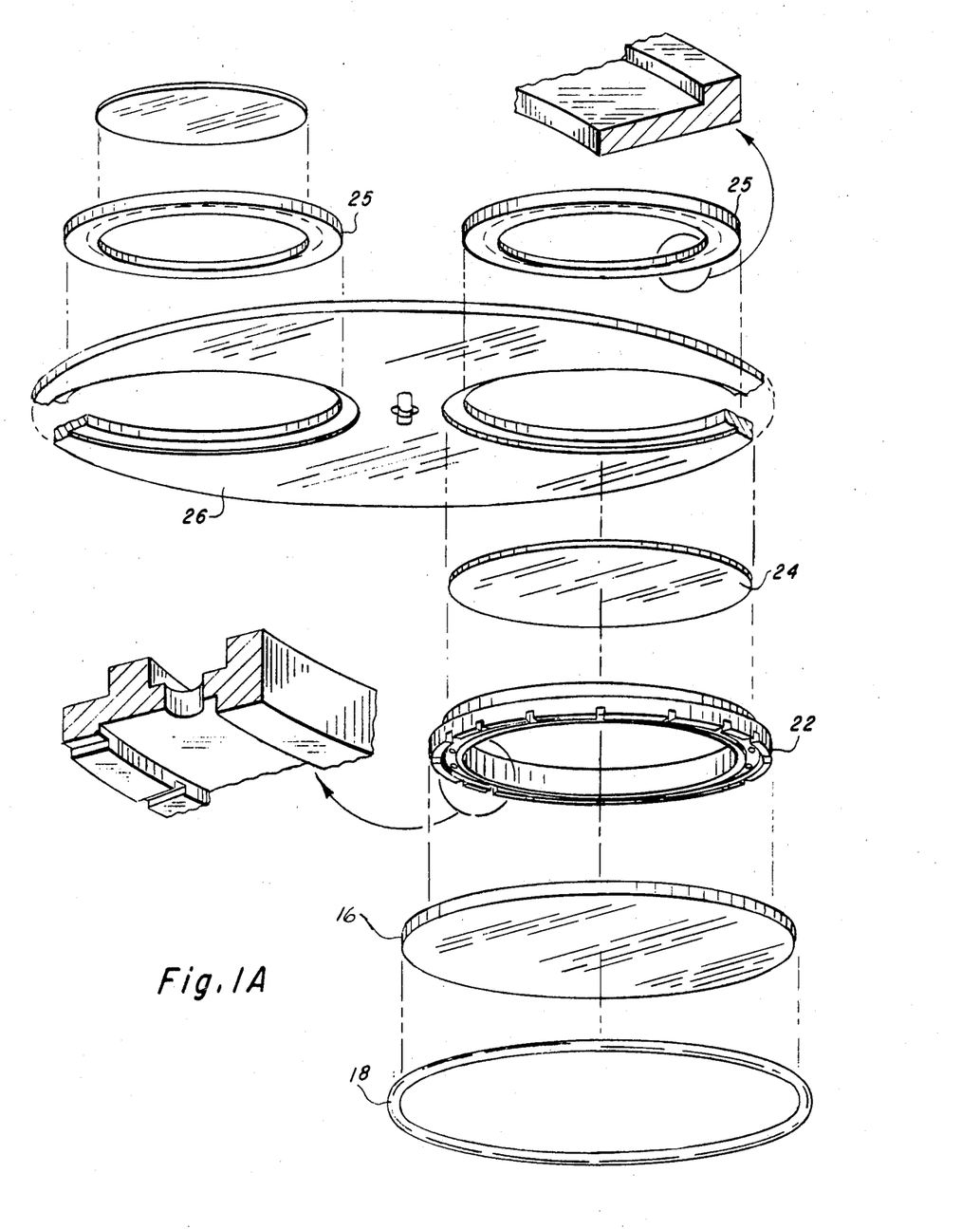
FIG. 1A is an exploded view or turntable and slice support mechanism.

The details of spin ring 22, slice support disk 24, slice positioning ring 22, and turntable 26 are shown in FIG. 1A. Note that a slice positioning ring is required for each of the openings in turntable 26. The reason for this will be subsequently described.

Figure 3:
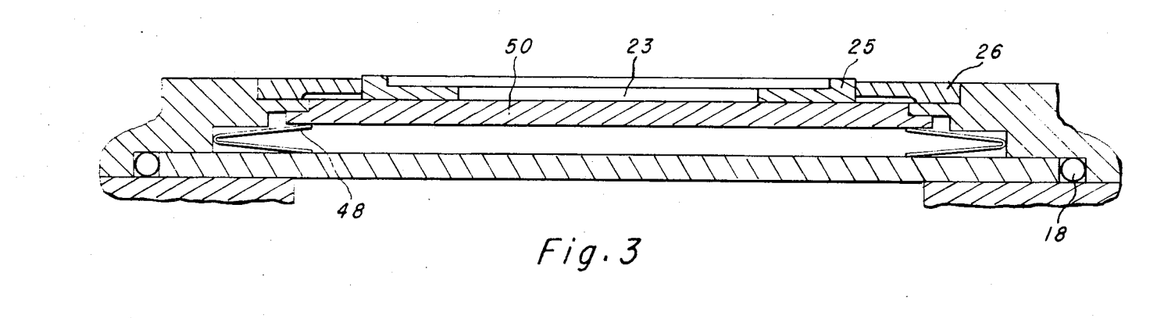
FIG. 3 is a cross-section view of a second embodiment of the slice support mechanism.

An alternate arrangement for the spin mechanism is shown in FIG. 3. Spin ring 22 has been replaced by a support clip 48 while slice support disk 24 has been replaced by spin disk 50. The remainder of the structure is essentially the same as previously described. Spin disk 50 differs from slice support disk 24 in that it has a series of openings positioned substantially in a circle near the center of the slice. These openings or passages are substantially cylindrical and make an angle of approximately 30° with the surface of the spin disk. The spin fluid flows up through these openings 51 (FIG. 3C) and between the surface of the slice 23 and the spin disk 50 and mixes with the deposition gas and flows out the exhaust port 42 of the system. This fluid flow performs two basic functions, the first being that the angle and direction of the flow out of openings 51 is at an angle such that it exerts a force on the semiconductor slice which causes it to spin and the flow is adjusted such that the semiconductor slice does not rest directly on the spin disk but is supported on a thin layer of fluid. The spinning of slice 23 and the support of the slice 23 on a thin layer of fluid assures a more uniformly deposited layer and that the slice does not stick to the spin disk 50 or the slice positioning ring 25 because the rotary motion of the slice prevents a continuous layer joining the slice to the other structures from forming.

Figure 3A:
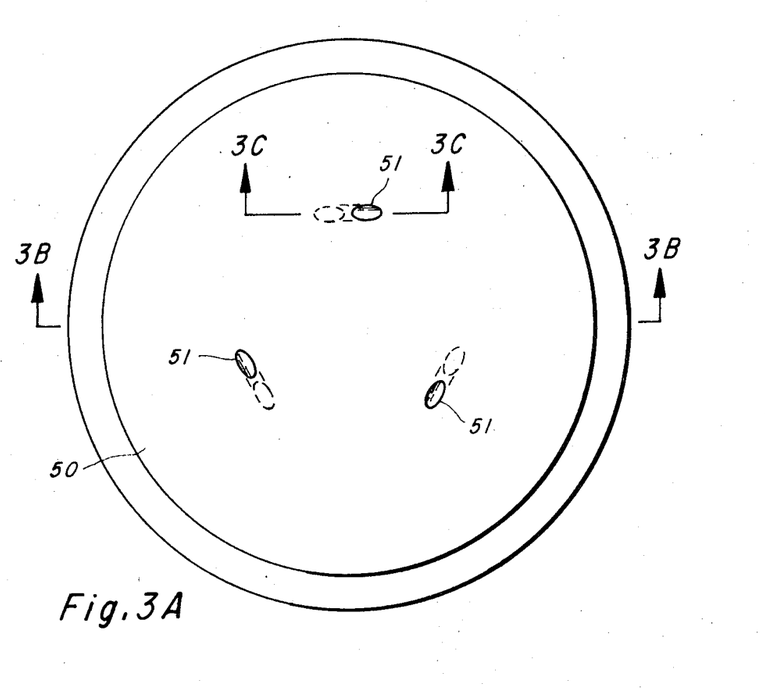
FIG. 3A is a top view of a spin disk.
Figure 3B:
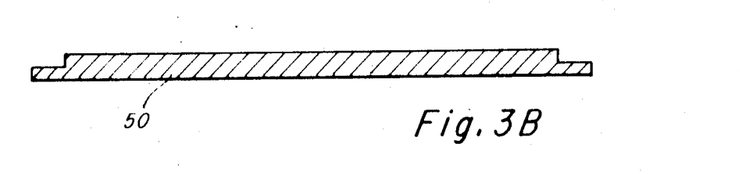
FIG. 3B is a cross-section view of a spin disk.
Figure 3C:
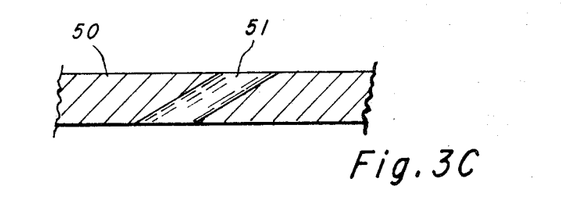
FIG. 3C is a partial cross-section view of a spin disk.

The details of spin desk 50 along with the orientation of the openings 51 therein are shown generally in FIGS. 3A, 3B and 3C.

Figure 4:
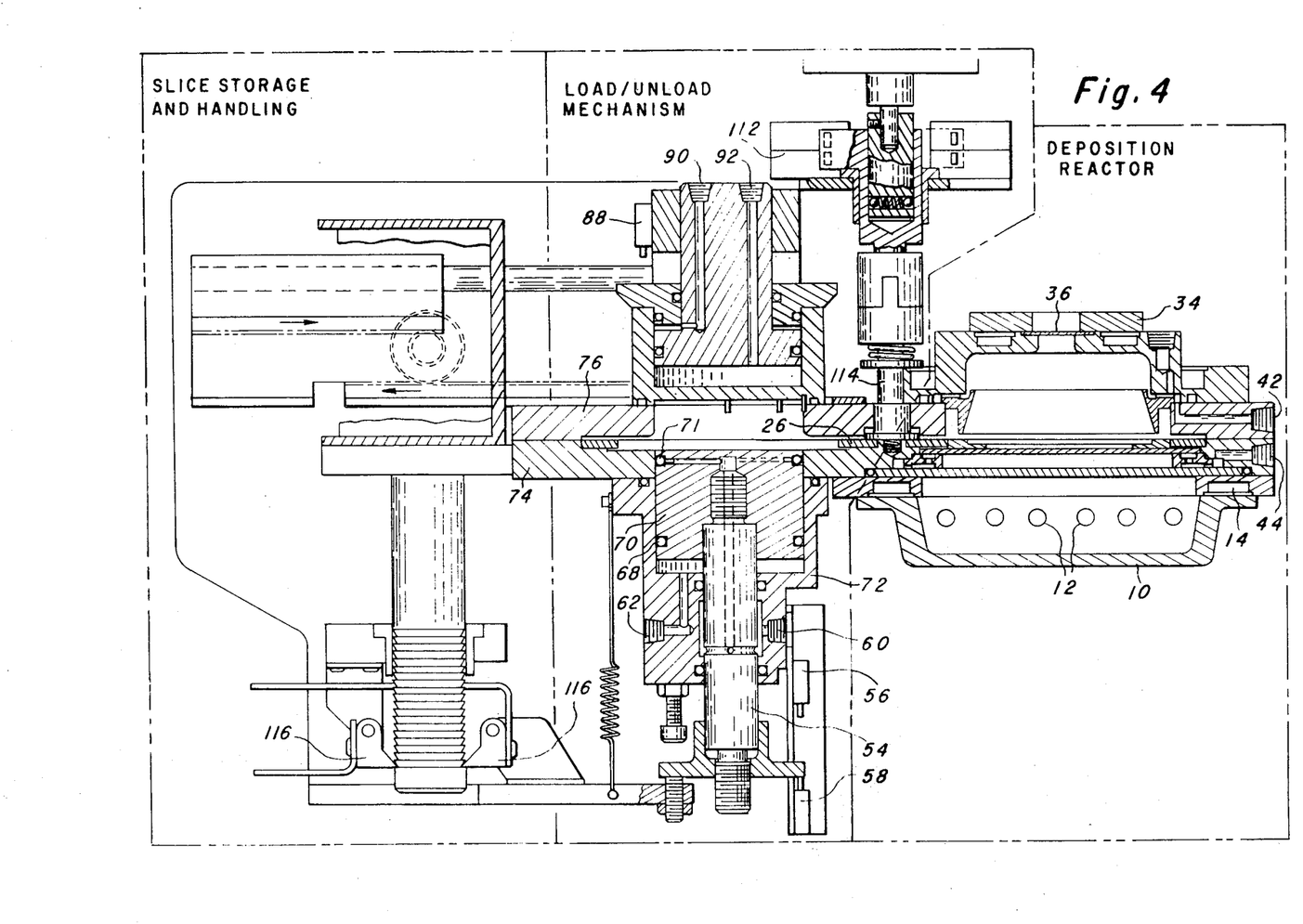
FIG. 4 is a cross-section view of a deposition system.

A cross-section of the deposition system is shown in FIG. 4. The system is divided into three sections for simplicity of explanation, these sections being the deposition reactor, the load/unload mechanism and the slice storage and handling section. These sections are enclosed in dotted lines and labeled in FIG. 4.

Functionally, the system as shown in FIG. 4 takes slices from a magazine and inserts them into the deposition reactor through an interlock system in the load/unload mechanism, thereby permitting the slices to be loaded into the deposition reactor without contamination of the reactor chamber by the external atmosphere. Slices are also similarly unloaded from the deposition reactor chamber. The slices are loaded and unloaded automatically with the slices being stored in a magazine, both before and after they have been cycled through the reactor. Since the operation of the deposition chamber has been previously described above, the following discussion will be limited to how the slices are transferred from the storage magazine through the interlock system into the deposition chamber and out of the deposition chamber through interlock systems and back into the storage magazine.

Figure 8:
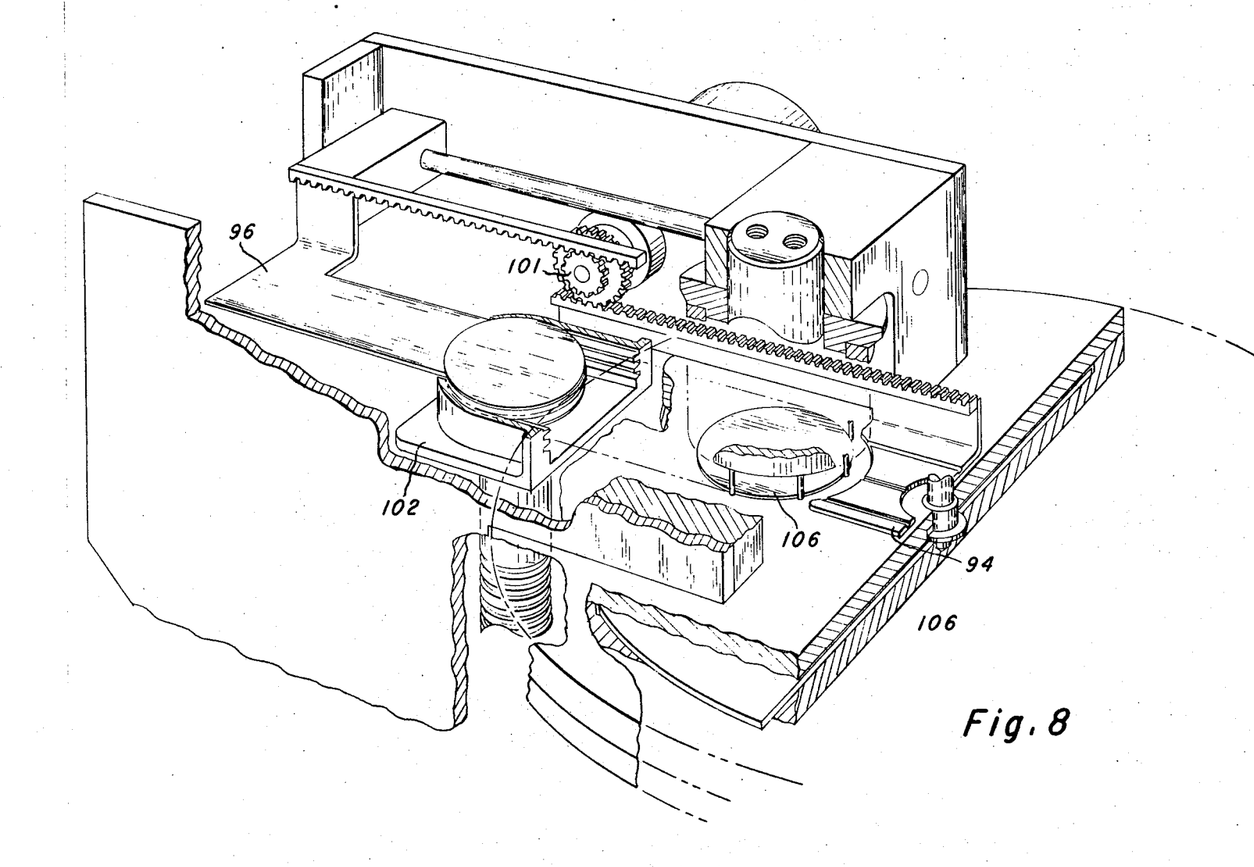
FIG. 8 is an isometric view of a slice storage and handling mechanism.

The description of the operation of the entire system will begin with the point where a slice has been loaded into the interlock system. The mechanism for transferring the slice from the storage magazine to the interlock system as well as the storage magazine is shown in FIG. 8 and will be discussed in detail subsequently. The interlock mechanism is shown in FIGS. 5–7 during different phases of the cycle during which a slice is transferred into or removed from the deposition chamber.

Figure 5:
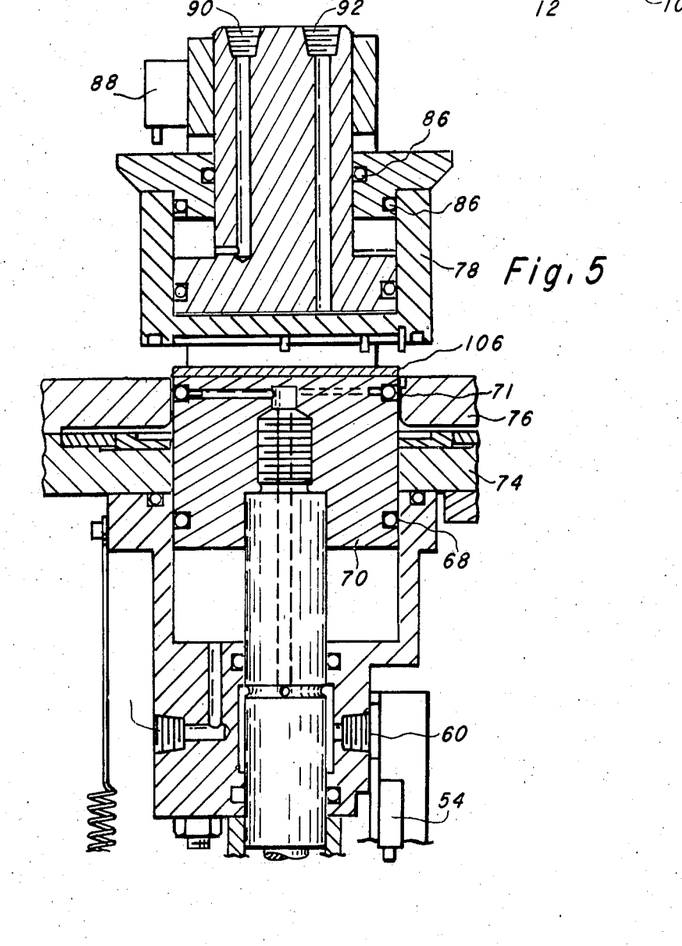
FIG. 5 is a cross-section view of an input cylinder and a lifter piston with the input cylinder and the lifter piston in their upper positions.

The semiconductor slice 106 is first positioned on the lifter piston 70, as generally indicated in FIG. 5. The lifter piston 70 is first positioned as substantially shown in FIG. 5 by applying a pressurized gas signal to the lifter piston high pressure input port 62. During the transition of the lifter piston 70 from its lower to upper position, the isolation seal 71 must be carefully controlled so that it is not damaged as it travels over the discontinuous surface caused by the indentations in the upper surface of the lower support plate 74 and the lower surface of the upper support plate 76. The operation of the isolation seal 71 will be discussed in detail later.

Figures 6, 7:
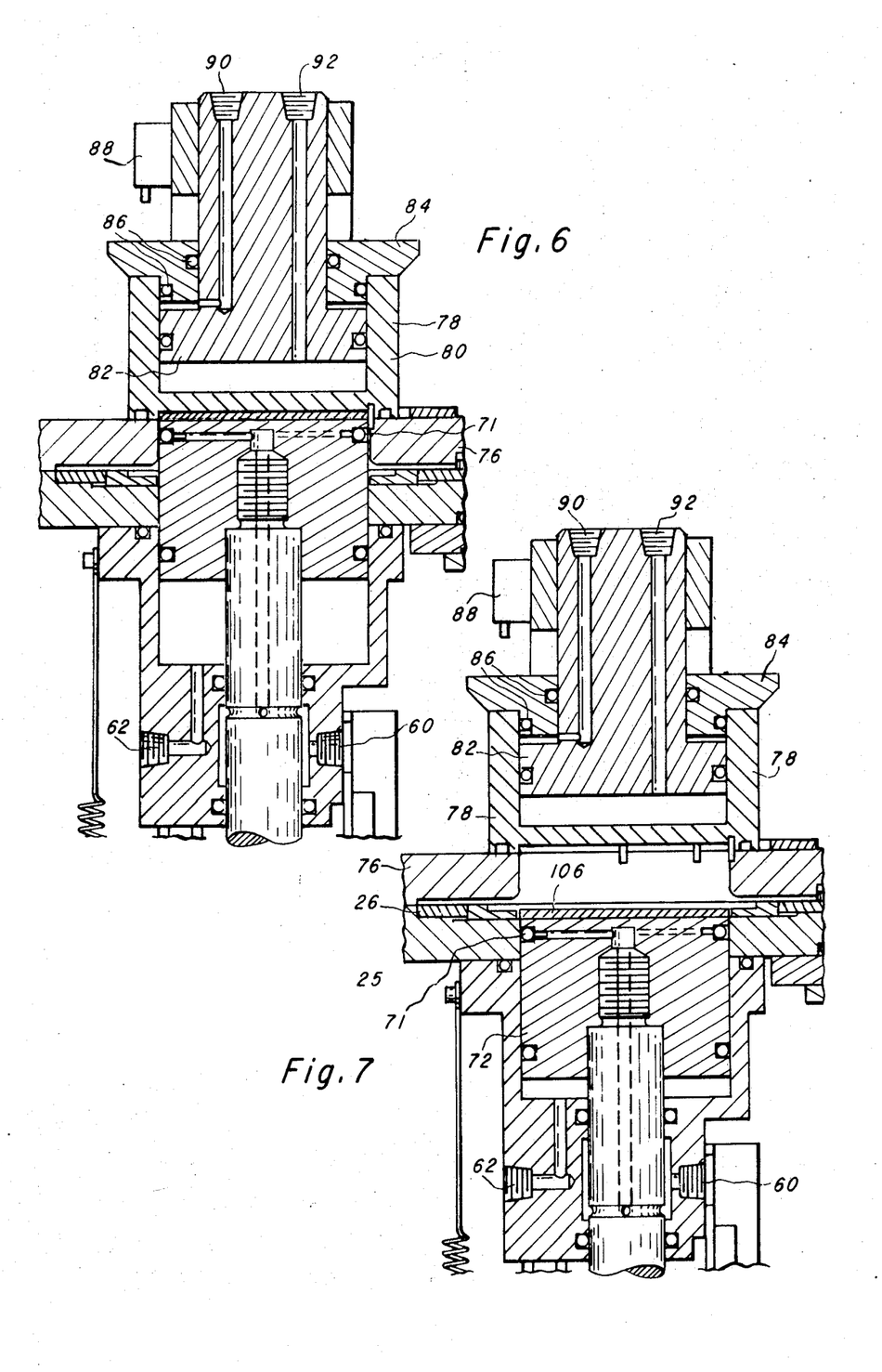
FIG. 6 is a cross-section view of an input cylinder and a lifter piston with the input cylinder in the lower position and the lifter piston in the upper position.
FIG. 7 is a cross-section view of an input cylinder and a lifter piston with the input cylinder and the lifter piston in the lower position.

After the slice has been placed on the lifter piston, as shown in FIG. 5, the input cylinder 78 is lowered to a position as shown in FIG. 6. The input cylinder is caused to move to this position by applying a pressurized gas signal to the lower input cylinder port 92. To insure the proper operation of the input cylinder 78 without excessive leakage of the pressurized gases, a first input piston seal 80 is provided to prevent leakage around the input piston 82. The input cylinder is also provided with a cover 84 to prevent the piston from coming out of the cylinder and the cover is provided with two seals 86 with one of the seals preventing gas from escaping around the piston shaft and the other seal preventing gas escaping between the inner wall of the input cylinder 78 and the input piston 82. Following completion of the cycle, the input cylinder 78 can be raised again by removing the pressurized gas signal to gas input port 92 and applying a pressurized gas signal to input port 90. However, prior to raising input cylinder 78, lifter piston 70 must be in its uppermost position and the input seal 71 energized in order to prevent contamination of the deposition reactor chamber.

The next step in the load process is to move the lift piston from the position shown in FIG. 6 to that shown in FIG. 7. This causes the wafer 106 positioned on the top of the lift piston 70 to move into a circular opening in the turntable 26 and in the slice positioning ring 25. Once the slice is positioned within the first opening in the turntable, the turntable is caused to rotate approximately 180°, thereby transferring the slice 106 from the top of the lift piston 72 to the deposition reactor chamber. The slice previously positioned in the deposition chamber is automatically returned by the same operation on the upper surface of the lifter piston 70 by a second opening in the turntable 26. The slice 106 is then transferred to a position where the bottom edge of the slice is substantially level with the upper edge of the upper support member 76 by the lifter piston 70, and the input cylinder 78 is raised and the slice transferred back to the magazine. The lifted piston is caused to raise by applying a pressurized gas signal to the lifter piston high pressure input port 62 and is caused to lower by applying a vacuum to the same port. Prior to any movement of the lifter piston, the isolation seal 71 is caused to retract to a position where no portion of the seal extends over the edge of the lifter piston by applying a vacuum to the isolation seal input port 60. Once the transition of the lifter piston has been made, a pressurized signal is applied to the same port, causing the isolation seal to expand and seal the deposition reactor chamber from contamination by the outside environment. The isolation seal is a neopreme O-ring with a cross-section diameter slightly greater than the width of the groove in the lifter piston 70. The overall diameter of the isolation seal 86 O-ring is slightly less than the outside diameter of the lifter piston 70.

Microswitches 88, 56 and 58 (FIG. 4) detect the extreme travel position of the input cylinder and the lifter piston. Signals from these switches are connected to a gas supply and control system (not shown) to supply the information necessary to assure that the proper pressurized gas and vacuum signals are applied to the proper ports in the proper sequence. A drive clutch mechanism 112 is coupled through a shaft 114 to turntable 26. The clutch mechanism 112 includes position detectors (not shown) to indicate when the turntable 26 is properly positioned such that the slice 106 is within the reactor chamber and a second opening is properly positioned to receive a new slice. The two circular openings in the turntable are shown in FIG. 1A.

If more than one layer is to be formed on the substrate during a single cycle through the system, a reactor chamber is added for each layer and the turntable 26 modified to include an opening for each chamber and an additional opening used in loading and unloading slices.

After the slice 106 has been positioned on the upper surface of the lifter piston 70, the input cylinder 78 is lowered by applying a pressurized gas signal to lower input cylinder port 90. This pressure forces the input cylinder seal 79 against the upper surface of the upper support plate 76 and thereby isolates the slice 106 from the outside environment. A vacuum signal is then applied to the seal input port 60. This signal causes the isolation seal 71 to move inward so that it no longer extends to or beyond the outer surface of the lifter piston 70. A vacuum signal is then applied to lifter piston port 60, thereby causing the lifter position to lower such that the slice 106 is positioned in the slice positioning ring 26 and in an opening in turntable 74. The drive mechanism is then activated, causing a slice previously placed in the deposition chamber to be interchanged with the slice positioned on the top surface of the lifter piston 70. The position of the lifter piston 70 prior to and after the slice 106 has been lowered into the turntable are respectfully shown in FIGS. 6 and 7.

Removal of a slice begins with the input cylinder and the input piston positioned as indicated in FIG. 7. The load and unload pawls 96, 98 are positioned as indicated in FIG. 8. It should be noted that these are the positions of these elements when the load cycle described above was completed. Thus the unload cycle can follow the load cycle without repositioning any elements of the system.

Beginning with the input piston 70 and a slice 106 thereon, as positioned in FIG. 7, the input piston 70 is raised by applying a pressurized gas signal to port 62. This signal causes the input piston 70 and the slice 106 positioned thereon to move to a position as indicated in FIG. 6. The isolation seal is then activated by applying a positive pressure to port 60 and the input cylinder 78 is raised to the position indicated in FIG. 5. Drive pinion 101 (FIG. 8) then rotates driving the unload pawls such that the unload pawl 94 pulls the slice 106 into the magazine 102 and the load pawl 96 pushes another slice from the magazine 102 to the top surface of the unload pawl 94. The drive piston 101 is then reversed, thereby retracting the load pawl 96 from the magazine and transporting the new slice which is on the upper surface of the load pawl 94 to the upper surface of the lifter piston 70. The system is now positioned as it was at the beginning of the above described load/unload cycle and the above discussed sequence of events is repeated.

As the lifter piston 70 moves downward during a subsequent loading cycle, racket pawls 116 (FIG. 4) index the magazine downward one slice, thereby permitting slices to be returned to the same slot in magazine 102 from which it was removed.

In the disclosed system dry nitrogen at a pressure of 50 PSI may be used as the pressurized gas signals to operate the load/unload mechanism.

To deposit an epitaxial layer on a silicon slice using the disclosed apparatus, the deposition gas is preferably silane adjusted to a flow of about 500 cubic centimeters per minute. The spin gas is preferably hydrogen adjusted to a flow of about 500 cubic centimeters per minute. The temperature of the silicon substrate should be maintained at a substantially constant temperature in within the range of 1000° to 1250° C., preferably about 1100° C.

The reactor system, which is the subject of this invention, improves the quality of the processed slices and increases the productivity of production personnel. The quality is improved because the limited volume and other design features of the reactor chamber permit the process to be more accurately controlled. Productivity of production personnel is improved because the reactor can be easily automated to an extent which permits a single operator to operate several systems. Versatility is also improved as compared with prior art systems because the addition of multiple reactor chambers to the system permits multiple processes to be performed in a single cycle through the system.

Although the system has been discussed with reference to a magazine storage and feed mechanism, other storage and feed mechanisms may be used.

What is claimed is:

1. A reactor for depositing a layer on a substrate by the selective precipitation of constituents of a gas on a surface of the substrate comprising, in combination:
   a. means for supporting and rotating said substrate comprising a floor member of the reaction chamber having inclined openings therethrough so arranged that a substrate placed over said openings will be supported slightly above said member and rotated by a fluid passing through said openings;
   b. heating and temperature control means for controlling the temperature of the substrate at a predetermined value;
   c. gas supply and control means for directing a deposition gas over at least one surface of said substrate such that at least one constituent of said deposition gas is precipitated on the surface of said substrate, thereby forming said layer; and
   d. a fluid supply and control means for supplying fluid under pressure to the openings in said floor member for the support and rotation of said substrate.

2. A reactor system for processing a substrate comprising, in combination:
   a. a reactor as defined in claim 1;
   b. storage means for storing the substrates before and after they have been cycled through said reactor; and
   c. transfer means for removing substrates from said storage means, cycling said substrates through said reactor, and returning said substrates to said storage means.

3. A reactor as defined in claim 1 wherein said heating and temperature control means comprises a radiant heater.

4. A reactor as defined in claim 3 wherein said floor member is substantially transparent to energy emitted by said radiant heater and said radiant heater is located below said floor member and external of the reaction chamber.

5. A reactor as defined in claim 1 wherein said fluid is a reducing gas.

6. A reactor as defined in claim 1 wherein said fluid is an inert gas.

7. A reactor for depositing a layer on a substrate by the selective precipitation of constituents of a gas on a surface of the substrate comprising, in combination:
   a. means for supporting and rotating said substrate comprising a floor member of the reaction chamber being substantially transparent to radiant heat energy and having inclined openings therethrough so arranged that a substrate placed over said openings will be supported slightly above said member and rotated by a fluid passing through said openings;
   b. a fluid supply and control means for supplying fluid under pressure to the openings in said floor member for the support and rotation of said substrate;
   c. heating and temperature control means for controlling the temperature of the substrate at a predetermined value comprising a radiant heater located below said floor member and external of the reaction chamber; and d. gas supply and control means for directing a deposition gas over at least one surface of said substrate such that at least one constituent of said deposition gas is precipitated on the surface of said substrate thereby forming said layer.

8. A reactor system for processing a substrate comprising, in combination:
 a. a reactor as defined in claim 7;
 b. storage means for storing substrates before and after they have been cycled through said reactor; and
 c. transfer means for removing substrates from said storage means, cycling said substrates through said reactor and returning said substrates to said storage means.

* * * * *